Jan. 19, 1965   H. E. SHAW, JR   3,166,627
METHOD AND APPARATUS FOR PHOTOELECTRICALLY
INSPECTING DEFECTS ON GLASS SURFACES
Filed March 6, 1964   6 Sheets-Sheet 1

INVENTOR.
HUGH E. SHAW JR
BY Oscar L. Spencer
ATTORNEY

FIG. 13

3,166,627
METHOD AND APPARATUS FOR PHOTOELEC-
TRICALLY INSPECTING DEFECTS ON GLASS
SURFACES
Hugh E. Shaw, Jr., New Kensington, Pa., assignor to
Pittsburgh Plate Glass Company, Pittsburgh, Pa., a corporation of Pennsylvania
Filed Mar. 6, 1964, Ser. No. 350,937
7 Claims. (Cl. 88—14)

This invention relates to the automatic inspection of polished plate glass in order to locate various defects whose presence impairs its optical and mechanical perfection.

Glass manufacturers attempt to produce polished plate glass sheets, without defects, having planar surfaces in perfect parallelism with each other. Unfortunately, plate glass as produced today falls short of this ideal. However, as various grades of plate glass are required for various purposes, certain defects, if not too severe, may be permitted. For example, highest quality mirror glass has optical requirements far in excess of those necessary for commercial plate glass, so that while certain, not severe, defects may be permitted in plate glass for high quality mirrors, other defects causing rejection of a silvered mirror are acceptable for commercial plate glass.

There are four types or families of defects which frequently may be present in the body of or on the surface of polished plate glass sheets and which mar the optical properties of polished plate glass sufficient to be discerned by the human eye.

The first family of defects, referred to as Type A defects, are microscopic surface defects. These defects are not localized, but are distributed over relatively wide areas of the glass surfaces and may be described and referred to as real type defects. Such defects susceptible of discernment are sweep, peel and short finish.

Sweep, a defect generally attributed to improper polishing, is characterized by a plurality of parallel, arcuate, shallow grooves of smoothly varying depth, and possesses a comparatively regular pattern having a modified sinusoidal elevation configuration across a section of glass. The width of such grooves generally varies from about 200 to about 800 microns, and the greatest depth varies from about 0.1 to about 0.2 micron.

Peel is characterized by irregular variations on the surfaces of plate glass, or non-planar elemental areas not lying in the same plane as the gross surfaces of the glass, and take the form of irregularly dispersed, shallow pits having rounded edges and rounded bottoms. While polished plate glass should be optically flat or have a focal length of infinity, these elemental areas perform optically as minute lens and have a distribution of focal lengths less than infinity. The width of such pits varies from about 200 to about 800 microns and the depth varies from about 0.1 to about 2 microns.

Short finish, resulting from incomplete polishing, characterize glass having elemental areas that have not been polished completely to the plane of the gross surface of the glass. The surface is pitted with sharp, irregularly surfaced indentations scattered through the surface. The depth of short finish pits varies generally from about ½ to about 10 microns, and the width from about 2 to about 40 microns.

The second family of defects, referred to as Type B defects, exist within the body of polished plate glass and result from incomplete blending of the various batch ingredients during the glass melting and fining operations and extend generally in the direction of the draw of the glass. These defects are strings, striae, and ream. When the inhomogeneities are oriented so that their length is aligned with the direction of glass draw and the planes of inhomogeneities are generally normal to planes of glass surfaces, the defect is called stria. When the inhomogeneities are aligned so that their major axes are oriented to extend in planes parallel to the glass surfaces, the defect is called ream. Strings are relatively thin, elongated, straight or gradually curled lines resulting from a slow solution of a large grain of sand or foreign material. While pure ream does not effect the optical properties of a glass sheet viewed normal to its surface, striae or any orientation of inhomogeneities containing a stria component of certain magnitude impairs the optical perfection of polished plate glass. All of these enumerated defects should be detected before any local area containing these defects are included in a large plate glass sheet.

A third class of defects, referred to as Type C defects, are those of the point type, which may be within the glass, i.e., of the inclusion type, or may be present at the surface of the glass. Inclusion type defects include stones, boils, blisters and seeds. Stones are solid inclusions of refractory material that have failed to melt into the glass, or are formed as a consequence of glass manufacture. Boils and seeds are gaseous inclusions, seeds being on the order of ⅒ to ½ milimeter in diameter and boils being larger. Blisters are elongated boils, usually being a fraction of a millimeter wide and several millimeters long. Surface point type defects include sand holes, and bloach. Sand holes are small fractures in the surface produced from the rough grinding operation, which have not been removed by subsequent fine grinding, and are generally 40 to 1000 microns wide and about 10 to about 250 microns deep. Bloach may consist of groups of sand holes as a result of incompletely fine grinding plate glass, caused by a low place in the plate which retains part of the original rough surface.

The fourth type of defects, generally referred to as Type D defects, are gross linear surface defects, broadly classified into scratches and sleeks. Scratches usually a linear or arcuate series of conchoidal fractures are long, deep, narrow defects in the glass surface having lengths varying from millimeters to meters, widths up to about a millimeter and depths on the order of hundreds of microns. Scratches are known under various names, such as block rakes, cullet cuts, runner cuts, and deck scratches, depending upon their origin.

Sleeks are very fine, smooth walled indentations in a glass surface, usually produced by a foreign particle in the polishing operation. Their lengths may vary from millimeters to meters, their width from about 10 to about 100 microns, and their depth from about ½ to 2 microns. Donut marks may be catalogued with either sleeks or scratches, depending upon their severity.

Usually plate glass, after being ground and polished, is manually and visually inspected for the presence of the various defects described which affect its optical and mechanical properties, and the inspectors mark the defect locations with chalk or crayon. This procedure is time consuming and requires a large number of specially trained personnel and, due to differences of opinion between the inspectors, leads to a lack of uniformity in the grading of glass.

It is proposed, according to the teachings of this application and the copending applications of George E. Sleighter and Joseph S. Zabetakis; and William F. Galey, Hugh E. Shaw, Jr., and George E. Sleighter, Serial Numbers 850,312 and 850,304, respectively, all assigned to assignee of this application and filed concurrently herewith, to provide methods and apparatus for automatically inspecting ground and polished plate glass, each application being directed to a method and apparatus for automatically inspecting the glass for one or more of the families or types of defects before enumerated. Automatic inspection, as opposed to manual and visual inspection, provides for the establishment of uniform standards for the grading of the glass into the particular required qualities, and may be accomplished while the glass is moving along a continuous line, either in the form of discrete sheets or a continuous ribbon, from the grinding and polishing stations to stations where the sheets or ribbons are cut into smaller commercial size sheets. A factor of great importance in such an operation is that the glass need not be removed from the line for inspection as is the usual situation when the glass is manually inspected, thus providing a more continuous manufacture of the sheets of plate glass.

To determine the manner of cutting the glass into small sized sheets the polished plate glass is passed, while on the continuous line, through a series of detectors, each capable of distinguishing a different type of family of optical defect. Means may be associated with each detector whereby an electrical signal indicating each defect detected is fed into a recording or defect storage device and a computer which determines the optimum manner of cutting the glass to remove the various imperfections detected, or into a marking device which marks each defect directly on the glass, so that a cutter may determine the optimum manner of cutting the glass.

The instant application is specifically directed to a method and apparatus for detecting defects of the beforementioned Type A.

A shadowgraph is produced when light from a point source intersects glass and impinges on a screen. This shadowgraph, when defects of the mentioned Type A are present on the glass surfaces, will have areas of light intensity higher than the normal background and areas of a light intensity lower than the normal background. The severity of defect area contributes to the frequency of occurrence and magnitudes of differing intensity. The areas of the different light intensities are caused by (1) the refraction of light by the defects known as peel and sweep, (2) the diffusion and/or scattering of light by the defect known as short finish, and (3) the absorption of light due to polishing media being imbedded in the defects.

Broadly, the device of this invention utilizes the shadowgraph principle, replacing the screen with a rotating disc having a relatively small aperture therethrough spaced from the axis of rotation of the disc. The aperture area is chosen so that it is generally smaller than the light and dark areas as realized on the plane of the rotating disc which in turn is dependent on the distances of (1) the light source from the glass, (2) the glass to the aperture and (3) the optical properties of the defects. The aperture looks at small incremental areas of the shadowgraph in which the light and dark spots are caused by defects in the glass. The aperture allows light of the varying intensities to pass therethrough, so as to impinge on a light sensitive element, such as a photomultiplier tube, a phototransistor, or the like, which converts the light energy into electrical signals of varying amplitudes. Electrical circuitry is associated with the light sensitive element to provide the signals in a usable form.

Therefore, the primary object of this invention is the provision of an apparatus for automatically inspecting ground and polished plate glass for determining the location of defects thereon of the aforementioned Type A.

Another object of this invention is the provision of an improved method for inspecting ground and polished plate glass for the location of defects thereon of the aforementioned Type A.

These and other objects and features of the invention will become apparent from the following description when taken with the accompanying drawings in which.

Figure 1:
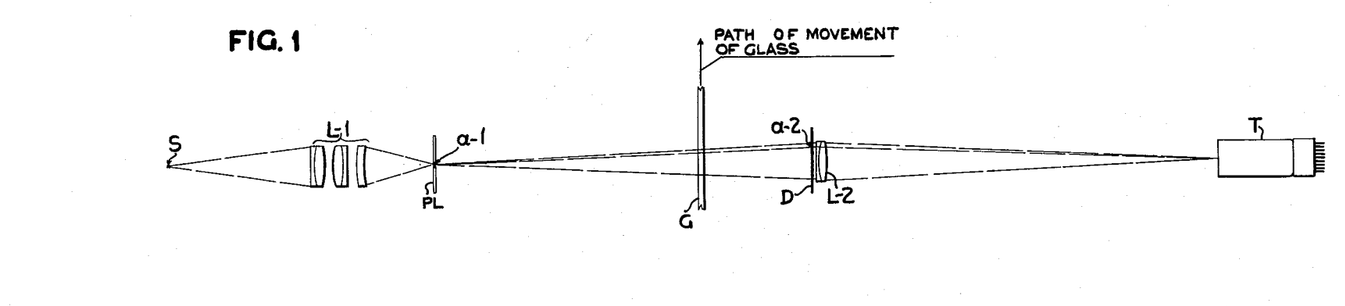
FIG. 1 is a ray diagram of the inspection device of this invention illustrating some of the component parts and their relation to the path of movement of the glass.

Looking at the drawings and in particular to FIG. 1 illustrating the ray diagram, we see from left to right, a source of light identified as S, a lens system L–1 for forming an image of the original light source in the plane of an apertured plate PL. The aperture $a$–1 now serves as a point source to serve the inspection device to be described. The light source, lens system and plate are disposed on one side of a sheet or ribbon of glass G. Preferably, the glass G moves in a path indicated by an appropriate legend and arrow. A rotary scanning disc D is disposed on the other side of the glass and is provided with a relatively small aperture $a$–2 which may be on the order of 0.01 inch diameter, radially disposed, for example, 0.5 inch from the optical axis and the axis of rotation, which axes should coincide for the best results, to intercept light passing through the glass and form a shadowgraph at the plane of the disc. A collecting lens systems L–2, which may or may not be mounted for concurrent rotation with the disc D, is positioned closely adjacent the scanning disc D for directing the rays of light passing through the rotating aperture in such a manner that it continuously intercepts the optic axis of the inspection device at a particular distance from the lens and aperture. The light sensitive element, preferably a photomultiplier tube T is preferably positioned at this intersection to avoid vagaries of sensitivity of the photosensitive surface.

*Light source*

Figures 2, 3:
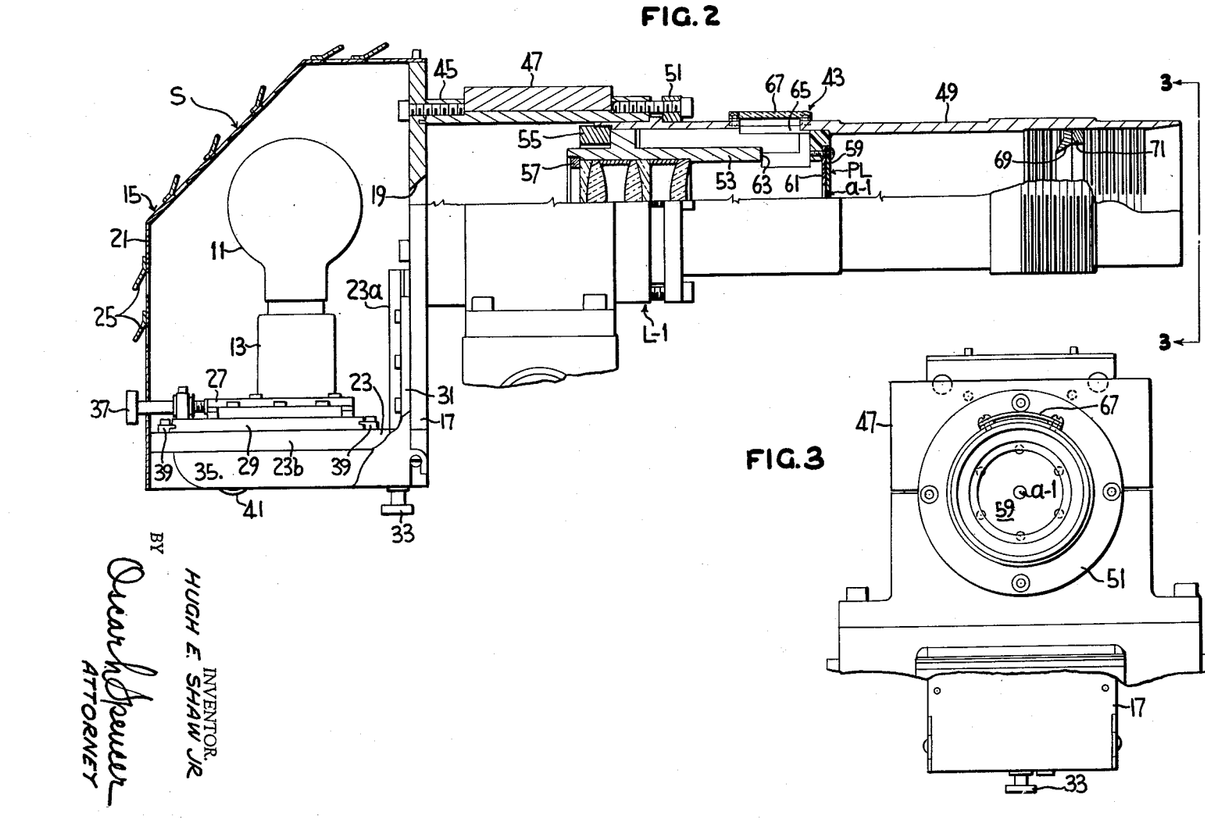
FIG. 2 is an illustration, partly in section, of the light source of the inspection device of this invention and its associated structure.
FIG. 3 is a view taken on line 3—3 of FIG. 2.

Turning now to FIGS. 2 and 3 showing the structural details of the light source S and associated parts which are disposed on one side of the glass, from left to right, there is the source of light S taking the form of a lamp or bulb 11 chosen for its characteristic of intrinsic brightness with its base received within a socket 13 connected to a source of regulated electrical power (not shown). The socket 13 and the bulb 11 are adjustably positioned within a lamp housing 15 which includes a front plate 17 having an aperture 19 with a tapered wall therethrough for the passage of light from the bulb, a cover 21 and an L-shaped base plate 23 having legs 23$a$ and 23$b$. The adjustability of the position of the lamp 11 allows proper focusing of its rays, as will be later explained. The cover 21 is provided with a plurality of louvres 25 for the dissipation of heat from the bulb 11. The socket 13 is fixed to a plate 27 and a plate 29 is interposed between the plate 27 and the leg 23$b$ of the base plate 23.

The leg 23$a$ of the base plate 23 is slidably received within a pair of spaced, parallel guide tracks 31 (only one of which is shown) fixed to the front plate 17 and extending vertically, as viewed in the drawing. An adjusting screw 33 having a portion of its length rotatably fixed to the front plate 17 and a portion of its threaded length received within a threaded portion of the base plate 23 is provided for adjusting the position of the base plate 23 relative to the front plate 17. Upon rotation of the screw 33, as is obvious, the base plate 23 is moved in the tracks 31 and relative to the front plate 17. The plate 27 is slidably received within spaced, parallel guide tracks 35 (only one of which is shown) fixed to the plate 29 and extending from front to back relative to the housing 15. An adjusting screw 37, mounted in a manner similar to the screw 33 provides a means for adjusting the front-to-back position of the lamp 11 relative to the housing 15. The plate 29 is slidably received within spaced, parallel guide tracks 39 fixed to the leg 23b of the base plate 23 which extend from side-to-side relative to the housing 15. An adjusting screw 41, mounted in a manner similar to the screw 33 provides a means for adjusting the side-to-side position of the lamp 11 relative to the housing 15.

An elongated tubular assembly 43 is connected to the lamp housing 15 and is positioned so as to be concentric with the aperture 19 in the front plate 17. The tubular assembly 43 is constructed in two parts, namely, a first tubular element 45 having a reduced center portion to receive a mounting bracket 47 by which the light source S and associated parts are attached to a support means for use, as will later be explained, and a second elongated tubular element 49 rigidly connected to the first element 45 by a clamp ring 51 and bolts, as illustrated.

A substantially cylindrical lens holder 53 is fixed within the element 49 by an annular retaining nut 55 threadably received within the element 49 adjacent one of its ends. The lens system L-1 is properly positioned and fixed within the lens holder 53 by a lock nut 57. The lens system L-1 is preferably of multiple element construction for imaging the light source at the apertured plate PL (see FIGURE 1). The plate PL, having the center aperture A-1, being extremely thin is positioned between a pair of thicker support plates 59 and 61 each having relatively large central apertures therethrough. The aperture A-1, preferably on the order of 0.030 inch diameter, becomes the effective point source of light for the device being described. The assembly of support plates 59 and 61 and aperture plate PL is connected to the lens holder 53. The lens holder 53 is formed with an opening 63 which when properly positioned is aligned with an opening 65 formed in the tubular member 49. A transparent cover plate 67 for the opening 65 is attached to the element 49. The openings 63 and 65 provide a means whereby the proper positioning of the bulb 11 with the rays of light focusing at the aperture A-1 may be visually determined. The means for positioning the bulb 11 has been previously described.

The elongated tubular element 49 is internally threaded adjacent its free end to threadably receive a reflection stop member 69 secured in the desired position by a lock nut 71. To prevent reflections of light within the tubular assembly 43 its interior is preferably optically threaded throughout its length and provided with a non-reflective coating.

*Scanning device*

Figure 4:
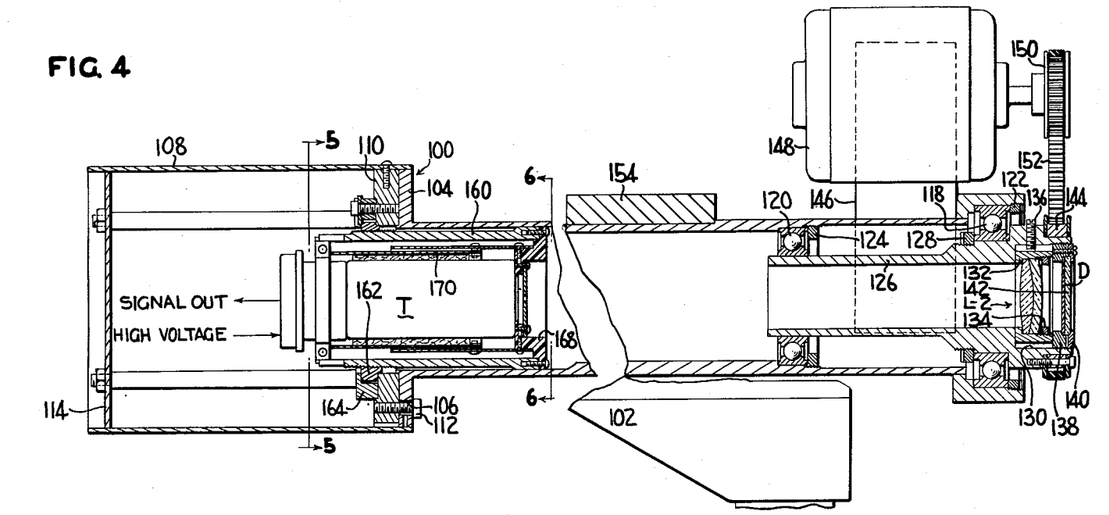
FIG. 4 is an illustration partly in section, showing the rotating scanning disc, the optics for impinging a ray of light on a particular location on the light sensitive element, the light sensitive element, associated components and the housing for these components.
Figure 5:
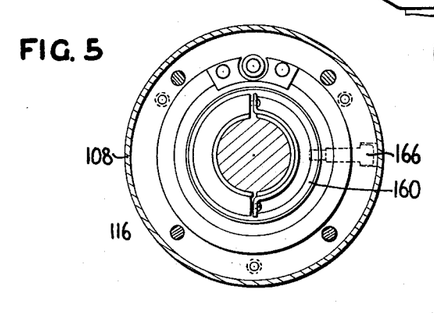
FIG. 5 is a section taken on line 5—5 of FIG. 4.
Figure 6:
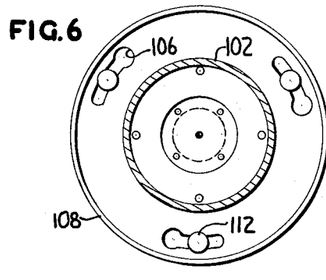
FIG. 6 is a section taken on line 6—6 of FIG. 4.

Attention is now directed to FIGS. 4 to 6 wherein the structure positioned on the other side of the glass and including the scanning disc D, the light sensitive element in the form of a photomultiplier tube T and other elements is illustrated. Looking at FIG. 4 from right to left (a direction away from the glass plane) the structure includes a tubular housing 100 comprising a first elongated tubular part 102 having an outwardly extending flange 104 provided with spaced key-shaped openings 106 (see also FIG. 6) and a second tubular part 108 of a diameter greater than the first tubular part. The tubular part 108 is attached to an annular base plate 110 having headed bolts 112 receivable in suitably spaced bores and extending therefrom. The headed bolts 112 are receivable in the spaced openings 106 to provide a means for connecting and disconnecting the tubular parts 102 and 108. The tubular part 108 is closed at a terminal end by a removable cover plate 114 spaced from the base plate 110 as illustrated.

The tubular part 102 adjacent its right end, as viewed in the drawing, is constructed to receive spaced annular bearings 118 and 120, such as ball bearings, fixed in their desired positions abutting shoulders in the tubular part 102 by means of lock nuts 122 and 124, respectively. A substantially cylindrical tube 126 is supported for rotation within the spaced bearings 118 and 120, and a lock nut 128 surrounding the tube fixes it in its proper position relative to the bearings and the tubular part 102. One end of the tube 126 is provided with a substantially cylindrical cavity 130 having at least a portion of its defining wall screw threaded. A cylindrical lens housing 132 having the collecting lens system L-2 fixed therein by a lock nut 134 is received within the cavity 130. The lens housing 132 is radially positioned within the cavity 130, so that its optic axis coincides with that of the entire device, by means of set screws 136 (only one of which is shown) passing through the tube 126 and engaging the outer periphery of the housing 132 and is retained in position by a lock nut 138 received within the cavity 130.

Figure 7:
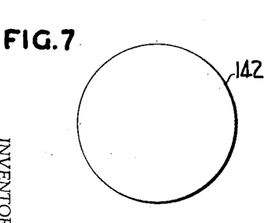
FIG. 7 is a view of the rotating scanning disc.

The scanning disc D is constructed of a relatively thin non-corrosive metal and is provided with the aperture A-2, which, as illustrated and previously described, is radially disposed from the center of the disc and the optic axis of the device. The disc D is fixed in position adjacent the collecting lens system L-2 by an annular retainer 140 connected to the lock nut 138. A protective transparent plate 142 covers the scanning disc D to prevent the entrance and retention of foreign material in the aperture A-2, the plate being also retained in position by the retainer member 140.

The tube 126 is constructed with a stepped terminal end to receive a flanged, toothed pulley 144 which is affixed thereto by means such as cap screws. A mounting bracket 146 is fixed, as by welding, to the tubular part 102 to provide a mounting for an electric motor 148 having a flanged, toothed pulley 150 connected to its shaft, the pulleys 144 and 150 being in alignment with one another. A flexible, toothed timing belt 152, preferably of an elastomer, such as rubber or the like, is directed over the pulleys 144 and 150 and its teeth mesh with the toothed peripheries of the pulleys, to provide a driving connection between the motor 148 and the tube 126. Rotation of the tube 126 necessarily causes rotation of the attached scanning disc D and the lens system L-2.

A mounting bracket 154 surrounds the tubular part 102 for mounting the structure adjacent the plane of the glass, as will be later described.

The photomultiplier tube T is positioned within the other end of the tubular part 102 by being received within a tube holder 160 slidably received within the part 102. The tube holder 160 is provided with an outer threaded portion to receive an annular adjusting nut 162 by which the axial position of the tube T may be adjusted. A clamping ring 164 connected to the base plate 110 engages the nut 162 and fixes the tube T in the tubular part 102. By loosening the clamp ring, changing the position of the lock nut and then tightening the clamp ring, the axial position of the tube may be adjusted. A key 166 (see FIG. 5) is received in a threaded bore in the base plate 110 and contacts an elongated slot in the tube holder 160 for holding the tube holder against rotation while allowing its axial positioning.

An annular member 168 constructed of an insulating material, such as nylon or the like, is attached to the tube holder 160 and assists in positioning the tube T. A shield 170, constructed preferably of mu-metal, is attached to the member 168 and surrounds the tube T. A felt sleeve surrounds the tube T within the shield 170.

The electrical connections of the photomultiplier tube T will be later described.

Mounting bridge

Figure 8:
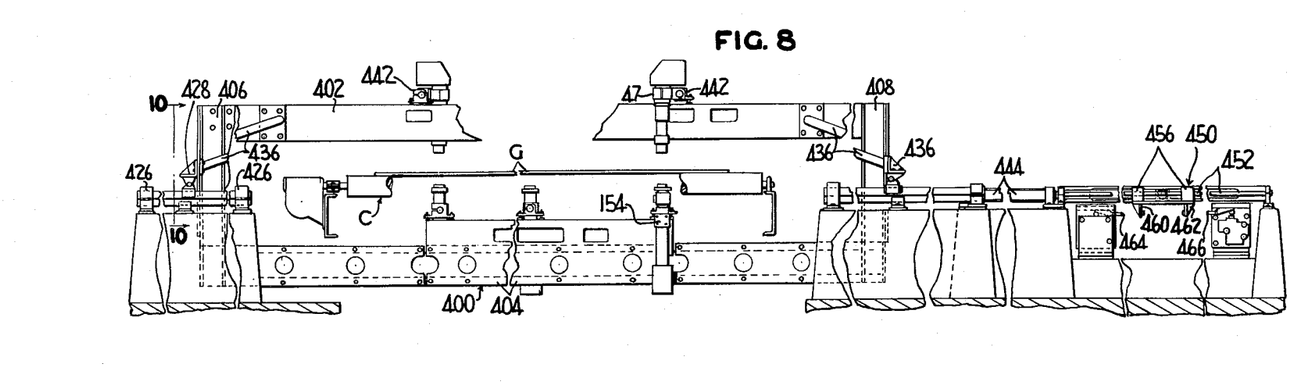
FIG. 8 is a broken side view of a mounting bridge and illustrating the manner of mounting inspection devices constructed in accordance with this invention adjacent the path of movement of the glass.
Figures 9, 10:
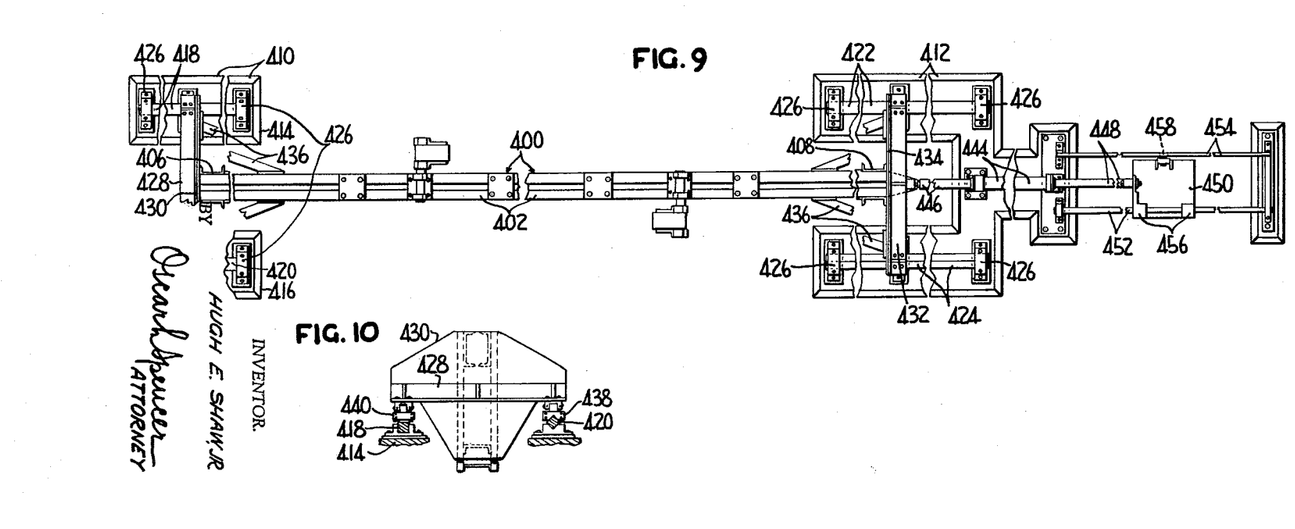
FIG. 9 is a plan view of the structure shown in FIG. 10.
FIG. 10 is a view taken on line 12—12 of FIG. 8.
Figure 12:
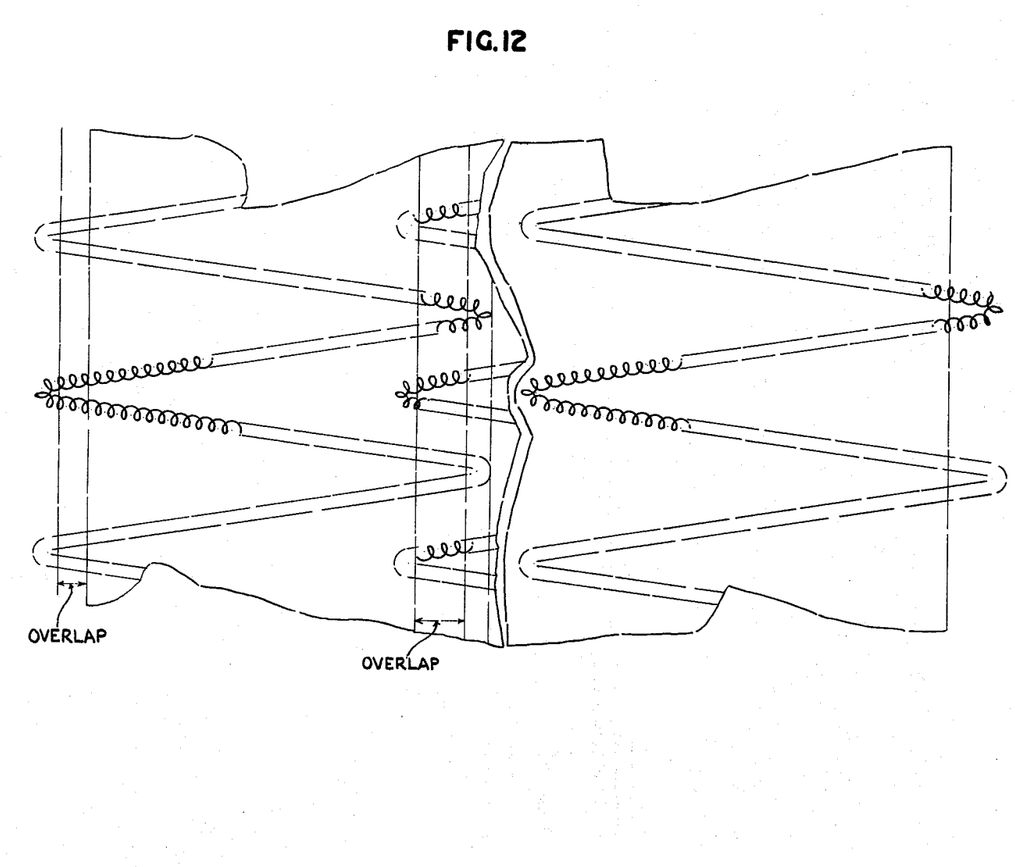
FIG. 12 is an illustration of the scanning pattern of a device constructed in accordance with the teachings of this invention.

Attention is now directed to FIGS. 8, 9 and 10 illustrating a bridge, generally identified as B, on which the light source and scanning device described are mounted. As illustrated, there are a plurality of the scanning devices and associated light sources mounted on the bridge. The bridge is constructed to extend and reciprocate transversely of the glass. The reciprocation of the bridge B and therefore of the scanning devices mounted thereon provide, with the movement of the glass, a scanning pattern such as shown in FIG. 12, to which later reference will be made.

The bridge B comprises a substantially rectangular framework 400 constructed of structural members which include an upper member 402, a lower member 404 and vertical end members 406 and 408. The framework 400, as previously stated, extends transversely of the glass and is arranged, so that the glass G is conveyed, as by a conventional conveyor C, through the framework 400.

Adjacent the ends of the framework 400 there are support bases 410 and 412 upstanding from the floor of the building in which the structure is housed. The base 410 is constructed in two spaced parts 414 and 416, and the base 412 is substantially Y-shaped in plan. Spaced, parallel guide rods 418 and 420 are fixed to the base parts 414 and 416, respectively, and spaced, parallel guide rods 422 and 424 are fixed to the base 412. The rods 418 and 422 are square in section and the rods 420 and 424 are diamond-shaped in section, as indicated in FIGURE 10. Means 426 are provided for mounting each of the guide rods 418, 420, 422 and 424 on the respective base parts.

A structural cross member 428 and a plate 430 are connected to the member 406, and a structural cross member 432 and a similar plate 434 are connected to the member 408. Reinforcing rods 436 connect the member 402 and the plates 430 and 434. Notched slides 438 are connected to each of the cross members 428 and 432, so as to be slidable along the diamond-shaped rods 420 and 424, and flat-based members 440 are connected to the opposite ends of the cross members 428 and 432, so as to be rollable along the rods 418 and 422. This arrangement allows ease of alignment and also transverse expansion and contraction of the bridge 400 without affecting its operation.

As illustrated in the drawings, the light source S and associated parts are connected by means of the bracket 47 to the member 402 and disposed to provide light rays substantially perpendicular to the plane of the glass G. Each scanning disc D and its associated parts is connected by means of the bracket 154 to the member 404 so the optic axes coincide. Split clamps 442 provide for the accurate positioning of the scanning devices with respect to their respective light sources to insure coincidence of the optic axes.

A double acting hydraulic cylinder 444 fastened to the base 412 is provided for reciprocating the bridge B and the scanning devices transversely of the glass G. The hydraulic cylinder 444 and the hydraulic system to be further described provide a desired, controlled motion of the bridge B and the attached detecting devices. One side of the piston of the cylinder 444 is connected by a rod 446 to the cross member 432 and the plate 434, and the other side of the piston is connected by a rod 448 to a rod support assembly 450.

The support rod assembly 450 is guided in its movement by spaced, parallel guide rods 452 and 454 of round and square cross-section, respectively, connected to the support base 412. The support rod assembly 450 is constructed to have portions 456 encompassing the rod 452 and a connected roller or slide 458 which rolls or slides on the rod 454. Depending from the assembly 450 are a pair of spaced actuators 460 and 462 adapted to cooperate with switch means 464 and 466 of a hydraulic system H, illustrated schematically in FIG. 11.

Figure 11:
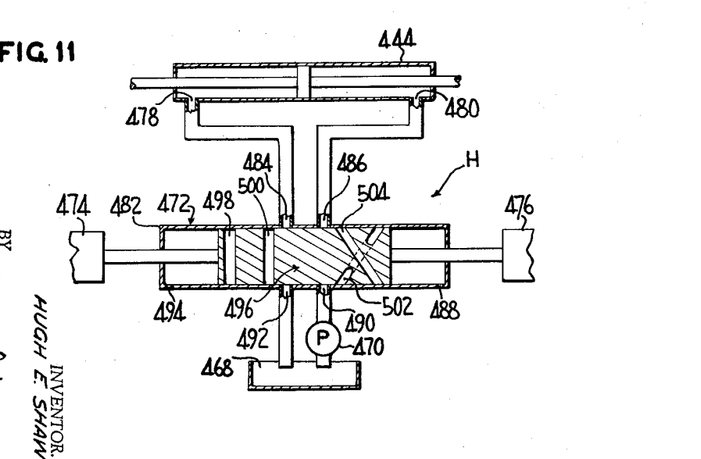
FIG. 11 is a scehmatic of a hydraulis system operable to reciprocate the bridge illustrated in FIGS. 10, 11 and 12.

The hydraulic system H comprises a source of fluid, such as a sump 468, a fluid pressurizing means, such as a pump 470, a spool valve 472, means to actuate the valve, such as solenoids 474 and 476, and the double acting cylinder 444. The switch means 464 and 466, upon being actuated by the actuators 460 and 462 cause energization of the respective solenoids and actuation of the spool valve, as explained below.

The cylinder 444 is provided with ports 478 and 480. The valve 472 includes a valve housing 482 with ports 484, 486, 488, 490, 492 and 494 and a spool 496 having parallel bores 498 and 500 and crossed but not intersecting bores 502 and 504. Opposite ends of the spool 496 are connected to the cores of the solenoids 474 and 476. The pump has an inlet communicating with the sump 468 and an outlet connected to the port 490. The port 492 is connected to the sump 468, the ports 478 and 484 are connected, and the ports 480 and 486 are connected. The ports 488 and 494 are bleed ports.

When the solenoid 476 is energized, as by actuation of the switch 466 by means of the actuator 462, the spool 496 is moved to connect the ports 484 and 492 by means of the bore 498 and to connect the ports 486 and 490 by means of the bore 500. Fluid from the pump 470 flows through the port 490, the bore 500, the port 486, the port 480 into the right end of the cylinder 444. Fluid is discharged from the left end of the cylinder 444 through the port 478, the port 484, the bore 498, the port 492 to the sump 468. The cylinder piston therefore moves to the left causing the bridge B to also so move. Thus, the support rod assembly 450 moves and deenergizes the solenoid 476, but because the solenoid 474 is not energized and there is no automatic return of the spool 496 to center position, the flow of fluid will continue, as described, until the solenoid 474 is energized.

Continued movement of the assembly 450 causes energization of the solenoid 474 by actuation of the switch 464 by means of the actuator 460. Thus, the spool 496 is moved to connect the ports 484 and 490 by means of the bore 504 and to connect the ports 486 and 492 by means of the bore 502. Fluid from the pump 470 flows through the port 490, the bore 504, the port 484, the port 478 into the left end of the cylinder 444. Fluid is discharged from the right end of the cylinder 444 through the port 480, the port 486, the bore 502, the port 492 to the sump 468. The cylinder piston therefore moves to the right causing the bridge B to also so move. Movement of the bridge B causes movement of the support rod assembly 450 and again causes energization of the solenoid 476, etc., to provide the reciprocations of the bridge B.

Ideally, constant velocity of the bridge and attached devices is desired; however, practical considerations of acceleration and deceleration times plus component constructions and load forces dictates that the hydraulic system be so constructed and arranged to provide substantially constant velocity through the scanning path exclusive of the overlap portions, in which portions deceleration and acceleration of the bridge and attached components occur. It is to be noted that the interlocked substantially constant velocity paths provide for scanning the entire transverse dimension of the glass.

Scanning pattern

Attention is now directed to FIG. 12 showing the scanning pattern relative to the glass G. The combined movement of the glass and the oscillations transverse of the glass by each scanner provides a substantially zig-zag path, as indicated, and there is provided, because of the placement of the scanners on the bridge B an overlap of adjacent patterns and an overlap of the pattern beyond the edges of the glass. These overlapping patterns are paths in which acceleration and deceleration of the bridge occur, as previously explained. The scanning disc D which continually rotates at a constant velocity provides a prolate cycloid path superimposed on the substantially zig-zag path, as indicated in the drawing. Rotation of the scanning disc D insures picking up defects having a linear nature, such as sweep and short finish, which would not necessarily be picked up by a linear sweep. Because of the nature of the Type A defects, i.e., occurring in areas, usually a foot or more in one dimension, generally accepted glass cutting practices, and probability study, the scanning envelope ranges from 15 to 25% of the total area of the glass. It is highly improbable that defect containing areas will be completely missed by the scanning pattern and thus used in a final cut piece of glass.

Circuitry, circuitry operation and functions

Figure 13:
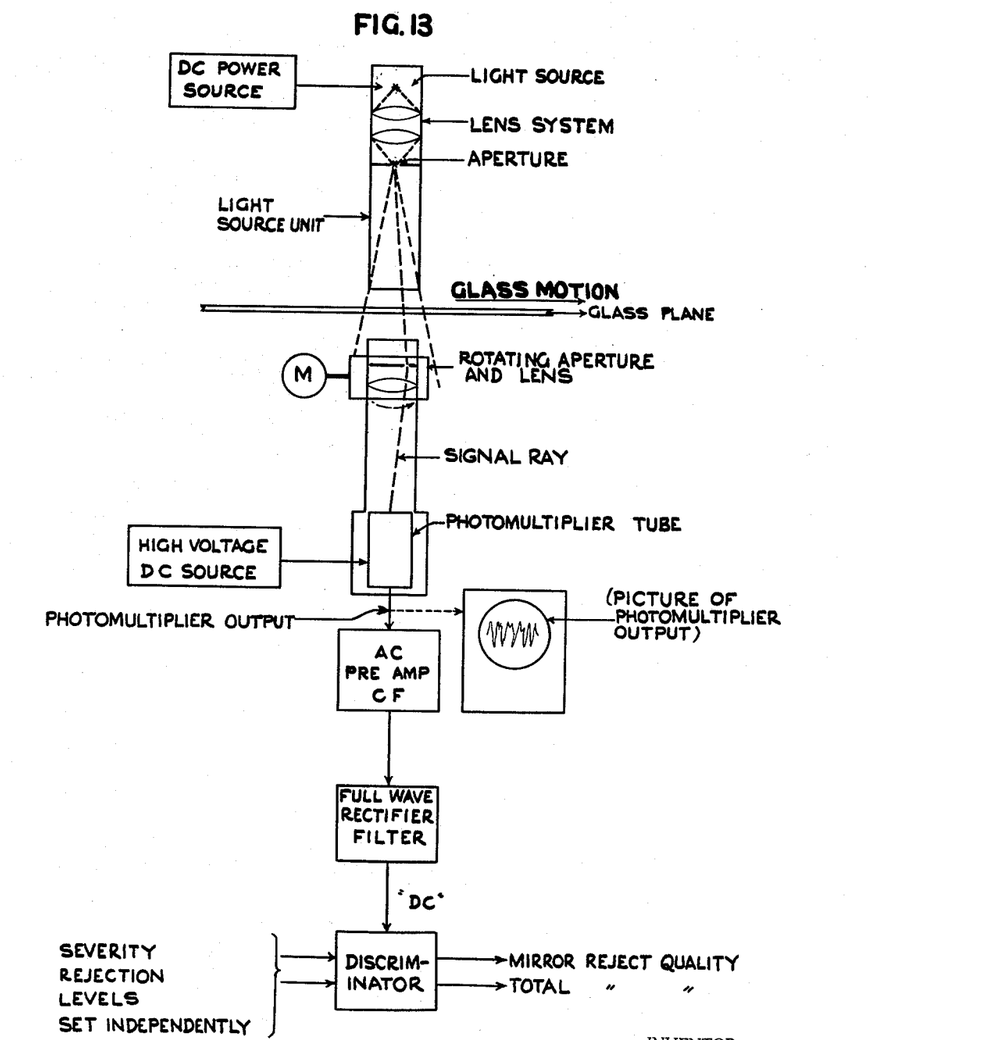
FIG. 13 is a block diagram of the light source, scanning device and electrical circuitry to provide electrical signals indicating defect severity.

Turning now to FIG. 13, the schematic block diagram showing a complete scanning assembly, of which there are a plurality in the system, we see the relation of the light source S and associated parts and the scanning device to the glass G. There is also indicated a high voltage D.C. source, a preamplifier, preferably of the cathode follower variety, a rectifier-filter, and a discriminator. Each of these electrical components is of conventional construction and require no detailed description of specific circuits. Note that, if desired, an oscilloscope may be included, so that a signal pattern can be visually observed. The signal pattern shown on the oscilloscope screen in the drawing is a typical pattern when Type A defects are present on the surfaces of the glass being inspected.

The light intensity variations, as seen by the rotating aperture, are picked up by the light-sensitive element, the photomultiplier tube T, which generates an A.C. voltage of varying amplitude and frequency related to the areal type defect severity present on the surfaces of the inspected glass. The high voltage D.C. supply furnishes the voltage for the tube's dinodes and the necessary plate voltage. The signals generated by the tube T, a pattern of which may be visually observed on the screen of the oscilloscope, are amplified to a desired level by the preamplifier preferably placed in close proximity to the tube T, so as to amplify the low level signals before they are subjected to external disturbances, such as stray voltage pickup. A cathode-follower variety of preamplifier is preferably used, so that the signals may be transferred through long lines without danger of losing high frequency response to line capacity. Also, the use of the cathode follower reduces the possibility of stray A.C. pickup and cross talk.

The rectifier filter is composed of a full wave rectifier which converts the A.C. signals fed from the preamplifier to pulsating D.C. signals, and a filter network which tends to smooth out the pulsating D.C. voltage. The filtering action of the circuit prevents occasional sharp, high amplitude spikes from distorting influencing the signal supplied to the discriminator. The sharp, high amplitude peaks are generally indicative of defects of the point type detected by another system, as previously explained. If such signals were utilized, a distorted picture of the distribution of A type, areal defects would occur and would interfere with accurate discrimination of defect severity. Thus, the effects of spike signals is substantially diminished.

The discriminator receives the rectified-filtered signals and supplies information to a device or devices for use in determining the optimum cutting of the glass into commercial size sheets. Because there are three qualities of glass, i.e., mirror, glazing and total reject, the discriminator must supply information related to defect severity. Thus, the information supplied is in the form of signals indicating mirror reject quality and total reject quality.

To provide the desired information, the discriminator includes comparator circuits which compare the rectified and filtered signals fed thereto with preset voltages representing severity rejection levels. Establishment of the preset voltages is determined from knowledge of acceptable quality levels.

Operation

The defects of Type A, as previously stated, are characterized by increments of the gross area not lying in a common plane. Surfaces of this type are nonplanar and will divert light from an otherwise predetermined path. In other words, defects of Type A will, if present on the surface of glass, modulate the intensity of light that is intersected by glass surfaces.

Also, as previously set forth, if placed at the proper distances, one on either side of a specimen, a screen and a point source of light will produce a shadowgraph, areas of which have a light intensity higher than the normal background and areas of which have a light intensity lower than the normal background, the areas of different light intensities than normal indicating defects on the glass. In the scanning device described herein, the scanning disc D having the small aperture $a$–2 rotated at a constant velocity has been substituted for the screen. The aperture $a$–2 intercepts increments of light flux dependent on the shadowgraph presentation at the plane of the disc, or, stated somewhat differently, the disc interrupts the beam of light and the disc aperture permits only a small portion thereof to pass. Thus, the aperture sees changes in light intensity as the disc goes through its period. The lens system L–2 loctaed directly behind the disc causes all the light transmitted by the aperture $a$–2 to impinge on the photosensitive element, such as photomultiplier tube T. The photomultiplier tube converts the light into usable electrical energy which is directly proportional to the light transmitted by the aperture.

The electrical energy in the form of signals of varying amplitude and freqeuncy, dependent on defect severity, are amplified, rectified and filtered and then fed to the discriminator which supplies signals indicative of glass quality. The latter signals are fed into a device or devices for ultimate use in determining the optimum cutting of the glass. Such device or devices may include a recorder or a storage device which feed the information upon demand to a computer or to a marking device which marks defect areas directly on the glass. The signals indicating severity and location of defects are, by electrical, mechanical or electro-mechanical means correlated with the corresponding areas of the inspected glass in a manner relating to generally accepted cutting practices, so that the end result is the determination of defect severity and location in a matrix of a desired, usually predetermined size.

For inspecting a ribbon or plate of glass 127 inches in width, traveling on the conveyor at speeds of 3.6 inches/second or 5 inches/second, depending on the thickness of the glass, i.e., ¼ inch and ⅛ inch, respectively, four scanning assemblies are employed. Each scanning assembly has a total scanning coverage of 40 inches and a usable scanning coverage of 32 inches, the difference between total and usable scanning coverage being the overlap of pattern as described. Thus, the scanning assemblies are mounted on the bridge on 32 inch centers, and the full stroke of the bridge is 40 inches with a usable stroke of 32 inches. The velocity of the bridge is a substantially uniform 24 inches/second except for the portions in which acceleration and deceleration occur. Each scanning disc of each scanning assembly, as previously stated, is provided with an aperture 0.010 inch in diameter spaced 0.5 inch from the optic axis of the assembly. To provide the desired scanning coverage, as explained, each scanning disc is rotated at approximately 1,675 r.p.m.

The scanning device, as described, is constructed and arranged to read both surfaces of the glass simultaneously.

This is obvious when it is remembered that light from the source passes through the glass.

The scanning device described is capable of modification in manners apparent to one skilled in the art. If it would be desirable to determine the location of defects on only one surface of the glass, the light source S and the scanner could both be positioned adjacent the same side of the glass, so that the scanner wold pick up reflected light. Such an arrangement could necessitate the use of a reflective coating on the side of the glass removed from the light source and the scanner, or the passing of the glass over a non-reflective surface.

In addition to the above, scanning device, such as that described, may be used for quality control operations without being mounted on a bridge adjacent the path of movement of the glass. In such use, random samples of glass would be inserted between the light source and the scanner, so as to obtain electrical signals indicating the severity of any defects of the sample. Such readings are indicative of the quality of glass being produced and could indicate that adjustments or repair of the grinding and polishing apparatus is desirable.

The foregoing invention has been described with particular reference to the inspection of ground and polished plate glass for determining the location and severity of the various enumerated defects. The invention may, however, be used to locate defects of similar nature, i.e., size, distribution, optical properties, etc., which may impair the quality of other materials, for example, sheet glass, plastics and other materials of various shapes and forms. For example, glass produced by the float process, i.e., by floating a layer of glass upon a molten bath of metal to produce a flat ribbon or sheet may be inspected in the manner above described. This is particularly true when such glass is undercleaned, i.e., when the surface of the glass in contact with the molten metal is polished, either mechanically with abrasives or chemically with etching-type solutions. However, it is also true even when the glass is not undercleaned, inasmuch as areal type surface defects can occur in glass produced by the float process independently of subsequent undercleaning.

This application is a continuation-in-part of my copending application Serial No. 850,347, filed November 2, 1959, and assigned to the assignee of this application.

I claim:

1. Apparatus for detecting areal type surface defects on a plate of glass that refract, diffuse, scatter or absorb light comprising means, including a source of light that is substantially a point source, to transmit a beam of light of given intensity; a conveyor for supporting and transporting glass through the path of said beam of light so that a surface of said glass intersects said beam; means, including a light sensitive element aligned with said beam, and responsive to variations in intensity of light impinging thereon, to provide signals indicative of the presence and severity of said defects; a rotary disc in the path of said beam of light between said source and said light sensitive element to interrupt said beam of light; an aperture in said disc, correlated in size with areas of the beam in the plane of said disc that are of different light intensities and caused by the defects to be detected, to permit a small portion only of said light beam to impinge upon said light sensitive element; means to move said light source, said rotary apertured disc and light sensitive element in a direction substantially transverse to the direction of movement of the glass so as to detect the presence of areal type defects in a zig-zag path on the surface of the glass; means to rotate said apertured disc at a rate that moves the aperture at a speed rapid with respect to the speed of glass travel and the speed of transverse travel of said light source, disc, and light sensitive element; electrical circuit means to diminish signals indicative of point type defects; and means to compare the signals indicative of the presence and severity of said areal type defects provided by said light sensitive element with predetermined signal levels to determine the severity of such defects.

2. Apparatus for detecting areal type surface defects on a plate of glass that refract, diffuse, scatter or absorb light comprising means, including a plurality of light sources, to transmit beams of nonconvergent rays of light of given intensity through the plate of glass; a conveyor for supporting and transporting glass through the path of said beams of light so that different portions across a surface of said glass intersect said beams; means, including a plurality of light sensitive elements each aligned with one of said beams, and responsive to variations in intensity of light impinging thereon, to provide signals indicative of the presence and severity of said defects; a plurality of rotary apertured discs, one in each path of light between said light sources and said light sensitive elements to interrupt the light beams; an aperture in each of said discs, correlated in size with areas of each beam in the plane of each of said discs that are of different light intensities and caused by the defects to be detected, to permit a small portion only of said light beams to impinge upon said light sensitive elements; means to move said light sources, said rotary apertured discs and said light sensitive elements in directions substantially transverse to the direction of movement of the glass so as to detect the presence of areal type defects in zig-zag paths on different portions of the surface of the glass, means to rotate said apertured discs at rates that move the apertures at speeds rapid with respect to the speed of glass travel and the speed of transverse travel of said light sources, discs, and light sensitive elements; electrical circuit means to diminish signals indicative of point type defects; and means to compare the signals indicative of the presence and severity of said areal type defects provided by said light sensitive elements with predetermined signal levels to determine the severity of such defects.

3. A method of detecting areal type surface defects on a plate of glass that refract, diffuse, scatter or absorb light as distinguished from point type defects, comprising the steps of transmitting a beam of light of nonconvergent rays from a light source, supporting and transporting said plate of glass through said beam of light so that a surface of said plate intersects said beam, masking said beam except for small incremental portions thereof, incrementally scanning for said defects portions of said plate intersected by said beam along an essentially cycloidal path in a zig-zag area of said plate, sensing variations in the intensity of said beam of light resulting from the presence of said defects in said plate, distinguishing between areal type defects and point type defects in the plate and producing an electrical signal in response to variations in the intensity of said beam due to areal type defects of a predetermined severity.

4. A method of detecting areal type surface defects on a plate of glass that refract, diffuse, scatter or absorb light as distinguished from point type defects, comprising the steps of transmitting a beam of light of nonconvergent rays from a light source, supporting and transporting said plate of glass through said beam of light so that a surface of said plate intersects said beam, moving said beam across the plate of glass transversely to the direction in which the plate is transported, scanning incremental portions of said beam at a predetermined plane at a rate rapid with respect to the rate at which the glass is conveyed and the rate at which the beam is moved, sensing variations in the intensity of said beam of light resulting from the presence of defects in said plate, distinguishing between areal type defects and point type defects in the plate and producing an electrical signal in response to variations in the intensity of said beam due to areal type defects of a predetermined severity.

5. A method of detecting areal type surface defects as distinguished from point type defects on a piece of glass having extensive, sensibly smooth surfaces which are substantially planar in the instant test area, which defects refract, diffuse, scatter or absorb light, comprising the steps of transmitting a beam of light of nonconvergent rays from a light source, supporting said glass and moving said glass and said beam of light relative to each other so that a surface of the glass intersects said beam, scanning incremental portions of said beam at a predetermined plane at a rate rapid with respect to the rate at which the glass and the beam are moved relative to each other, sensing variations in the intensity of said beam of light resulting from the presence of said surface defects in the glass, distinguishing between areal type defects and point type defects on the surface of the glass and producing an electrical signal in response to variations in the intensity of said beam due to areal type defects of a predetermined severity.

6. A method of detecting areal type surface defects as distinguished from point type defects on a piece of glass having extensive, sensibly smooth surfaces which are substantially planar in the instant test area, which defects refract, diffuse, scatter or absorb light, comprising the steps of transmitting a beam of light of nonconvergent rays from a light source, supporting and transporting said glass through said beam of light so that a surface of the glass intersects said beam, masking said beam except for small incremental portions thereof, incrementally scanning for said defects portions of the glass intersected by said beam along an essentially cycloidal path, sensing variations in the intensity of said beam of light resulting from the presence of said surface defects in the glass, distinguishing between areal type defects and point type defects on the surface of the glass and producing an electrical signal in response to variations in the intensity of said beam due to areal type defects of a predetermined severity.

7. The apparatus of claim 1 further including a lens system rotatable with said rotary apertured disc to cause all the light transmitted through the apertured disc to impinge on the light sensitive element.

No references cited.